United States Patent
Uchida et al.

(10) Patent No.: US 12,051,778 B2
(45) Date of Patent: *Jul. 30, 2024

(54) LITHIUM-ION BATTERY CONTAINING ELECTROLYTE INCLUDING CAPACITY RESTORATION ADDITIVES AND METHOD FOR RESTORING CAPACITY OF LITHIUM-ION BATTERY

(71) Applicant: TOYOTA JIDOSHA KABUSHIKI KAISHA, Toyota (JP)

(72) Inventors: Satomi Uchida, Okazaki (JP); Shinobu Okayama, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 222 days.

This patent is subject to a terminal disclaimer.

(21) Appl. No.: 17/682,252

(22) Filed: Feb. 28, 2022

(65) Prior Publication Data
US 2022/0181693 A1 Jun. 9, 2022

Related U.S. Application Data

(63) Continuation of application No. 16/703,953, filed on Dec. 5, 2019, now Pat. No. 11,316,196.

(30) Foreign Application Priority Data

Dec. 21, 2018 (JP) .................................. 2018-239573

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/4235* (2013.01); *H01M 10/48* (2013.01); *H01M 2300/004* (2013.01)

(58) Field of Classification Search
CPC ......... H01M 10/0567; H01M 10/0525; H01M 10/4235; H01M 10/48
(Continued)

(56) References Cited

U.S. PATENT DOCUMENTS 11,316,196 B2 * 4/2022 Uchida ............ H01M 10/0567
2012/0212186 A1 8/2012 Fujii et al.
(Continued)

FOREIGN PATENT DOCUMENTS

CN 102709589 A * 10/2012 ........ H01M 10/0525
CN 102709589 B 4/2016
(Continued)

OTHER PUBLICATIONS

Uchida, Satomi et al., U.S. Appl. No. 16/703,953, filed Dec. 5, 2019.

*Primary Examiner* — Sean P Cullen
(74) *Attorney, Agent, or Firm* — Sughrue Mion, PLLC

(57) ABSTRACT

(A) A first lithium-ion battery is prepared. (B) A capacity loss of the first lithium-ion battery is detected. (C) Capacity restoration treatment is performed on the first lithium-ion battery having a detected capacity loss to produce a second lithium-ion battery. The first lithium-ion battery includes at least a positive electrode, a negative electrode, and an electrolyte solution. The electrolyte solution contains a lithium salt, a solvent, and an additive in advance of the detecting a capacity loss. The additive has an oxidation potential. The oxidation potential is higher than an OCP of the positive electrode in the first lithium-ion battery having a state of charge of 100%. The capacity restoration treatment involves charging the first lithium-ion battery in such a way that at least part of the additive is oxidized.

12 Claims, 5 Drawing Sheets

(51) Int. Cl.
*H01M 10/42* (2006.01)
*H01M 10/48* (2006.01)

(58) Field of Classification Search
USPC .................................. 429/188, 326, 340, 341
See application file for complete search history.

(56) References Cited

U.S. PATENT DOCUMENTS

| | | |
|---|---|---|
| 2014/0113203 A1 | 4/2014 | Jie et al. |
| 2015/0125742 A1 | 5/2015 | Hokuto et al. |
| 2020/0203771 A1 | 6/2020 | Uchida et al. |

FOREIGN PATENT DOCUMENTS

| | | |
|---|---|---|
| JP | 10-079262 A | 3/1998 |
| JP | 2000156243 A | 6/2000 |
| JP | 4296620 B2 * | 7/2009 |
| JP | 2011-076930 A | 4/2011 |
| JP | 2013-012387 A | 1/2013 |
| JP | 2015-149250 A | 8/2015 |

\* cited by examiner

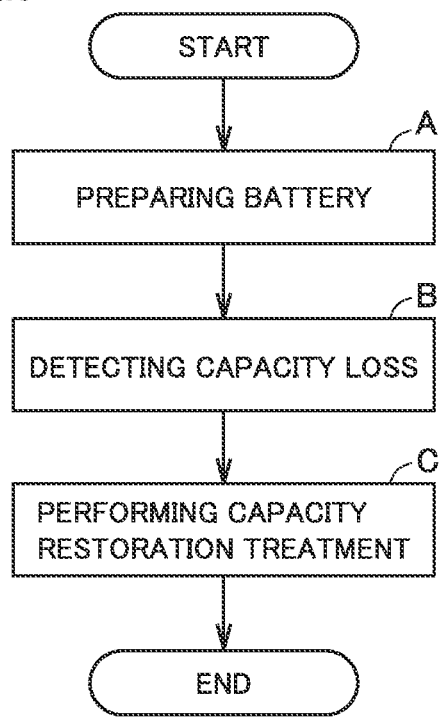
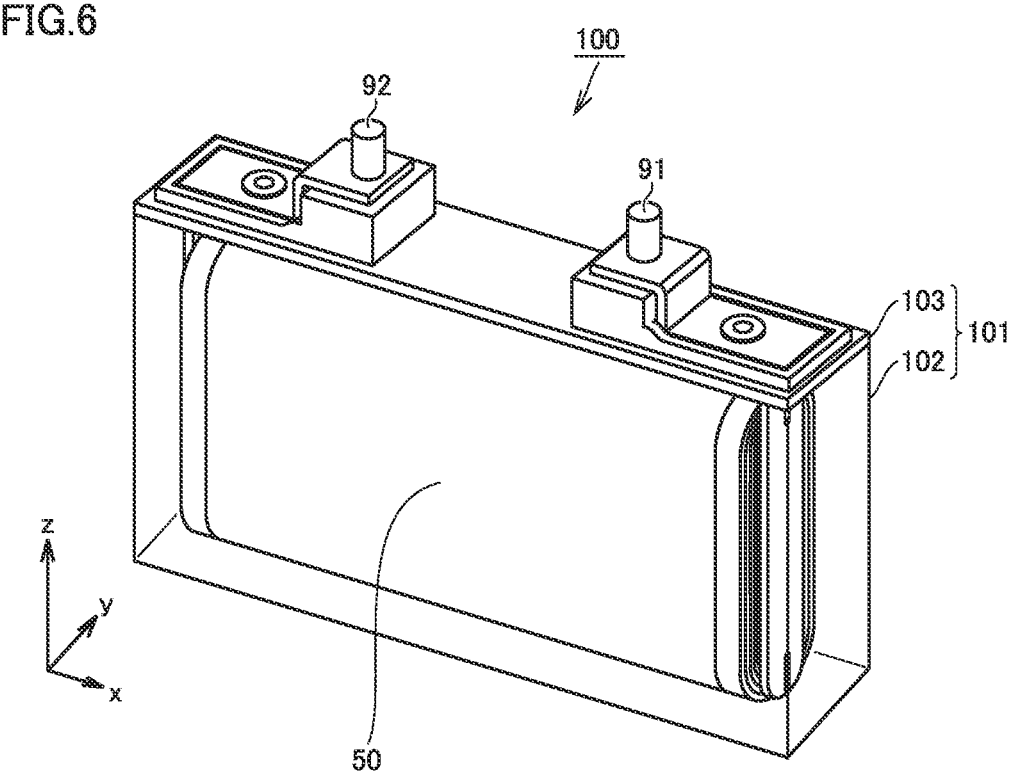

LITHIUM-ION BATTERY CONTAINING ELECTROLYTE INCLUDING CAPACITY RESTORATION ADDITIVES AND METHOD FOR RESTORING CAPACITY OF LITHIUM-ION BATTERY

This application is a continuation of U.S. application Ser. No. 16/703,953 filed Dec. 5, 2019 (allowed), which claims priority to Japanese Patent Application No. 2018-239573 filed on Dec. 21, 2018, with the Japan Patent Office. The entire disclosures of the prior applications including the specification, drawings and abstract are incorporated herein by reference in their respective entireties.

BACKGROUND

Field

The present disclosure relates to a method of producing a lithium-ion battery and to a lithium-ion battery.

Description of the Background Art

Japanese Patent Laying-Open No. 2011-076930 discloses a method of restoring capacity of a lithium-ion battery.

SUMMARY

Capacity of a lithium-ion battery (which may be simply called "battery" hereinafter) gradually decreases along with, for example, repeated use of the battery. A cause of this capacity loss is a loss of balance in open circuit potential (OCP) between a positive electrode and a negative electrode.

FIG. 1 is a first graph illustrating an OCP balance.

FIG. 1 includes an SOC-OCP curve for a positive electrode and an SOC-OCP curve for a negative electrode. The ordinate in FIG. 1 represents an open circuit potential (OCP) of a positive electrode or a negative electrode. Hereinafter, the open circuit potential of a positive electrode may be simply called "positive electrode potential" and the open circuit potential of a negative electrode may be simply called "negative electrode potential". The abscissa in FIG. 1 represents the state of charge (SOC) of a battery. The "SOC" represents the ratio of the remaining capacity of a battery at a point of time in question to the full charge capacity of the same battery.

In a battery in an initial state, it is considered, for instance, that when the SOC of a positive electrode increases by $\Delta x$ [%], the SOC of a negative electrode also increases by $\Delta x$ [%]. This state is in OCP balance.

FIG. 2 is a second graph illustrating an OCP balance.

Suppose a situation where, during charge, a lithium ion ($Li^+$) released from a positive electrode is not absorbed by a negative electrode but transforms into an inert Li, which does not contribute to charge or discharge. The inert Li may be LiF or $Li_2CO_3$, for example.

The positive electrode releases $Li^+$ in an amount equivalent to $\Delta x$ [%]. The SOC of the positive electrode increases by $\Delta x$ [%]. All the $Li^+$ released from the positive electrode transforms into inert Li. The $Li^+$ is not absorbed by the negative electrode, and thereby the SOC of the negative electrode does not increase. This causes a $\Delta x$ [%] difference in the relationship between the positive electrode potential and the negative electrode potential. In other words, OCP is out of balance. The loss of OCP balance renders part of the capacity (for example, a capacity of $\Delta x$ [%]) unusable. In other words, a capacity loss occurs.

FIG. 3 is a third graph illustrating an OCP balance.

In Japanese Patent Laying-Open No. 2011-076930, an additive (capacity-restoring agent) is added to a battery with a capacity loss. The additive is added to an electrolyte solution. The oxidation potential of the additive according to Japanese Patent Laying-Open No. 2011-076930 is within the operating SOC range of the battery (an SOC range of 100% or lower).

After the addition of the capacity-restoring agent, the battery is charged in such a way that the positive electrode potential exceeds the oxidation potential of the additive. This causes oxidation of the additive, instead of oxidation of a positive electrode active material, at the positive electrode. In the electrolyte solution, $Li^+$ is present in abundance. When the additive is thus oxidized instead of a positive electrode active material, $Li^+$ is not released from the positive electrode but $Li^+$ in the electrolyte solution may be absorbed by the negative electrode. In other words, the SOC of the positive electrode does not increase and only the SOC of the negative electrode increases. This may mitigate loss of OCP balance.

As mentioned above, the oxidation potential of the additive according to Japanese Patent Laying-Open No. 2011-076930 is within the operating SOC range of the battery. Therefore, the additive if added to the electrolyte solution in advance of detection of a capacity loss may not contribute to capacity restoration. This is because when the battery is used, the additive is oxidized and consumed. For this reason, the addition of the additive according to Japanese Patent Laying-Open No. 2011-076930 to the electrolyte solution needs to be carried out after detection of a capacity loss.

It should be noted that the battery under normal circumstances is in a hermetically sealed state. Therefore, the addition of the additive to the electrolyte solution after detection of a capacity loss requires opening the battery. Opening and then hermetically re-sealing the battery takes time and work.

Typically, oxidation of the additive is accompanied by gas generation. For allowing the generated gas to be released, the battery needs to remain open for a predetermined period of time. Many of the components contained in the battery deteriorate when exposed to air. For this reason, opening the battery may degrade battery performance.

An object of the present disclosure is to restore capacity of a lithium-ion battery without opening the lithium-ion battery.

In the following, the technical structure and the effects according to the present disclosure are described. It should be noted that the action mechanism according to the present disclosure includes presumption. Therefore, the scope of claims should not be limited by whether or not the action mechanism is correct.

[1] A method of producing a lithium-ion battery according to the present disclosure includes at least (A) to (C) described below:

(A) preparing a first lithium-ion battery;
(B) detecting a capacity loss of the first lithium-ion battery; and
(C) performing capacity restoration treatment on the first lithium-ion battery having a detected capacity loss to produce a second lithium-ion battery.

The first lithium-ion battery includes at least a positive electrode, a negative electrode, and an electrolyte solution.

The electrolyte solution contains a lithium salt, a solvent, and an additive in advance of the detecting a capacity loss.

The additive has an oxidation potential. The oxidation potential is higher than an open circuit potential of the positive electrode in the first lithium-ion battery having a state of charge of 100%.

The capacity restoration treatment involves charging the first lithium-ion battery in such a way that at least part of the additive is oxidized.

In the method of producing a battery according to the present disclosure, the capacity restoration treatment is performed on a battery having a decreased capacity (first lithium-ion battery) and thereby a battery having a restored capacity (second lithium-ion battery) is newly produced. Hereinafter, the first lithium-ion battery may be simply called "first battery" and the second lithium-ion battery may be simply called "second battery".

FIG. 4 is a fourth graph illustrating an OCP balance.

In the method of producing a battery according to the present disclosure, the oxidation potential of the additive is outside the operating SOC range of the first battery (an SOC range higher than 100%). Therefore, the additive may be less likely to be oxidized during normal use of the first battery. For this reason, the method of producing a battery according to the present disclosure allows the electrolyte solution to contain the additive in advance of detection of a capacity loss (typically, allows the electrolyte solution to contain the additive at the time of completion of the production of the first battery). Hence, the method of producing a battery according to the present disclosure makes it possible to perform the capacity restoration treatment without opening the first battery.

In the method of producing a battery according to the present disclosure, the capacity restoration treatment is performed outside the operating SOC range (an SOC range higher than 100%) after detection of a capacity loss. In other words, the first battery is charged in such a way that at least part of the additive is oxidized. This may mitigate loss of OCP balance and restore capacity.

[2] The additive may consist of a plurality of components. The plurality of components are different from each other in oxidation potential. The capacity restoration treatment may involve charging the first lithium-ion battery in such a way that part of the plurality of components is oxidized and the other part of the plurality of components is not oxidized.

When the additive thus includes a plurality of components that are different from each other in oxidation potential, the capacity restoration treatment may be performed multiple times in a separate manner. Take a situation where the additive includes two components that are different from each other in oxidation potential, for example. After a capacity loss is detected, a first capacity restoration treatment is performed in such a way that one of the components with the lower oxidation potential is oxidized. When another capacity loss occurs after this, a second capacity restoration treatment is performed in such a way that the remaining component (the component that was not oxidized by the previous capacity restoration treatment) is oxidized. The remaining component is one of the two components with the higher oxidation potential.

In accordance with the number of components included in the additive, the capacity restoration treatment may be performed three or more times. In accordance with the scale of a capacity loss, charging may be performed in such a way that only a part of the components is oxidized in a single capacity restoration treatment. In accordance with the scale of a capacity loss, charging may be performed in such a way that a plurality of components are oxidized in a single capacity restoration treatment. In accordance with the scale of a capacity loss, charging may be performed in such a way that all the components are oxidized in a single capacity restoration treatment. Needless to say, all of these aspects are encompassed by the scope of the method of producing a lithium-ion battery described in [1] above.

[3] The additive may include at least one selected from the group consisting of 2-methoxynaphthalene and thiophene, for example.

The oxidation potential of each of 2-methoxynaphthalene and thiophene may be higher than the positive electrode potential of the first battery having an SOC of 100% (in other words, a positive electrode potential in a fully-charged state). Therefore, each of 2-methoxynaphthalene and thiophene may be usable in the capacity restoration treatment according to the present disclosure.

The oxidation potential of 2-methoxynaphthalene is different from the oxidation potential of thiophene. When the additive includes both 2-methoxynaphthalene and thiophene, the capacity restoration treatment may be performed at least twice.

[4] A lithium-ion battery according to the present disclosure includes at least a positive electrode, a negative electrode, and an electrolyte solution. The electrolyte solution contains a lithium salt, a solvent, and an additive. The additive consists of a plurality of components. The plurality of components are different from each other in oxidation potential. The plurality of components include at least one selected from the group consisting of 2-methoxynaphthalene and thiophene.

In the battery described in [4] above, the capacity restoration treatment may be performed multiple times in a separate manner.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a flowchart schematically illustrating the method of producing a lithium-ion battery according to the present embodiment.
FIG. 6 is a schematic view illustrating an example configuration of the lithium-ion battery according to the present embodiment.

DESCRIPTION OF THE PREFERRED EMBODIMENTS

Figure 1:
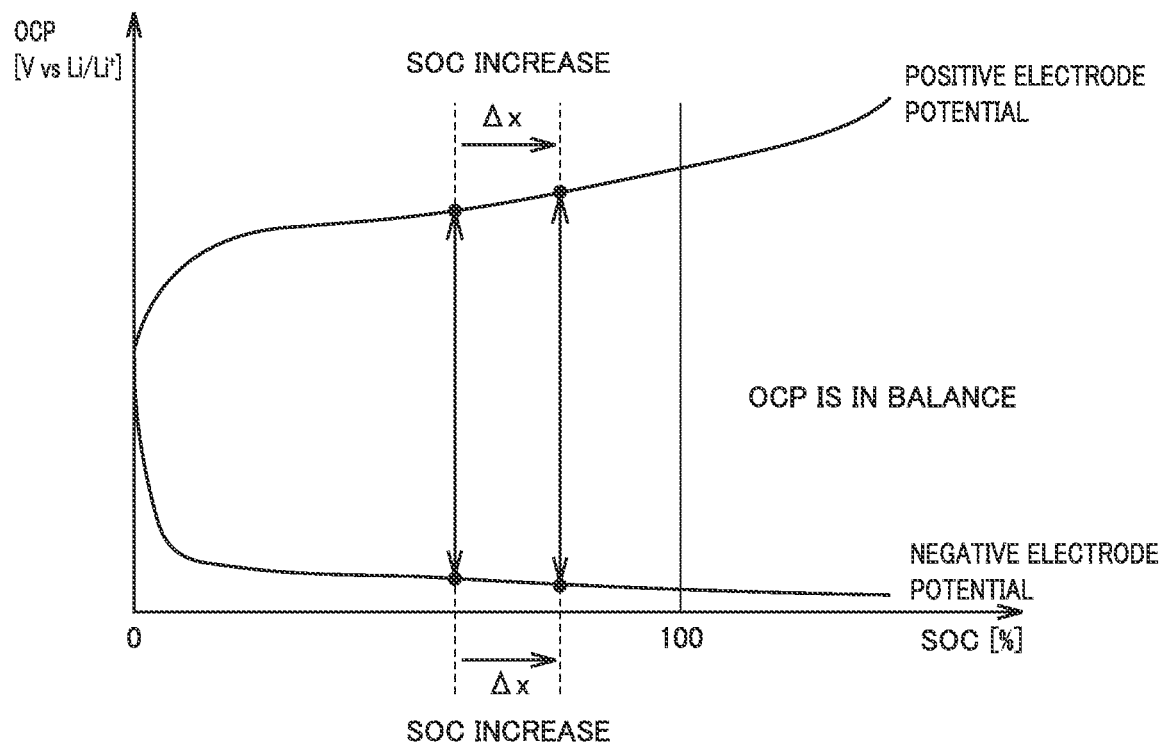
FIG. 1 is a first graph illustrating an OCP balance.
Figure 2:
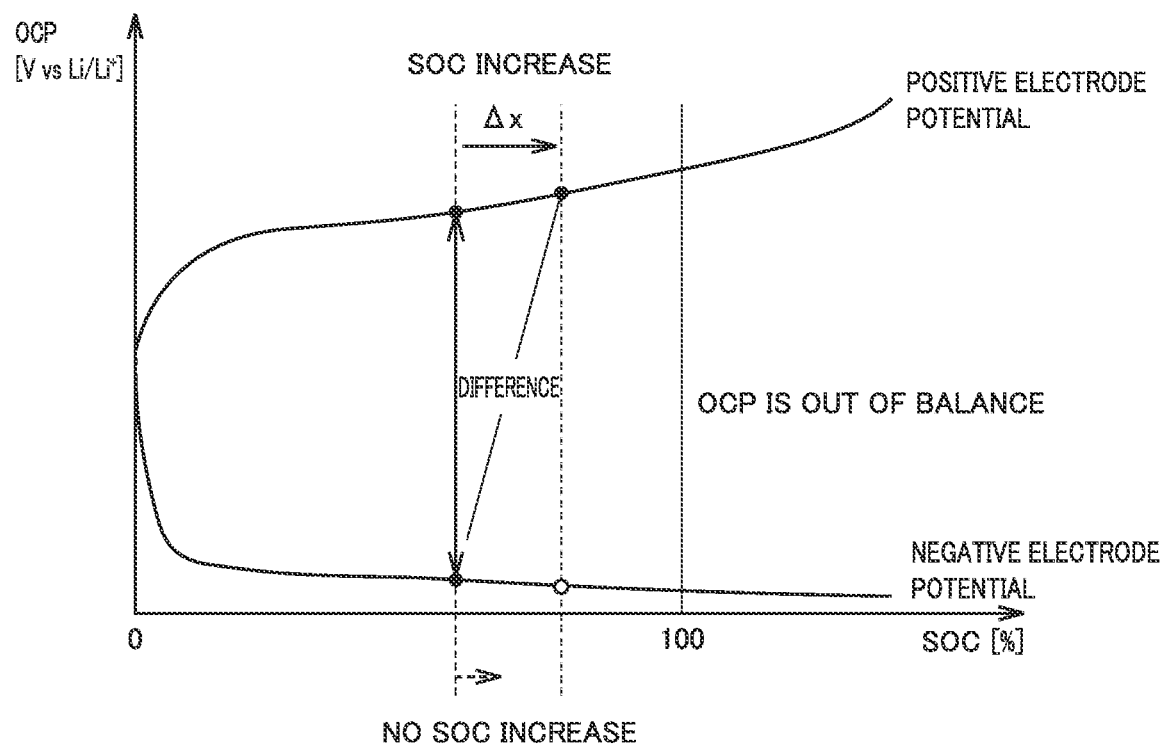
FIG. 2 is a second graph illustrating an OCP balance.
Figure 3:
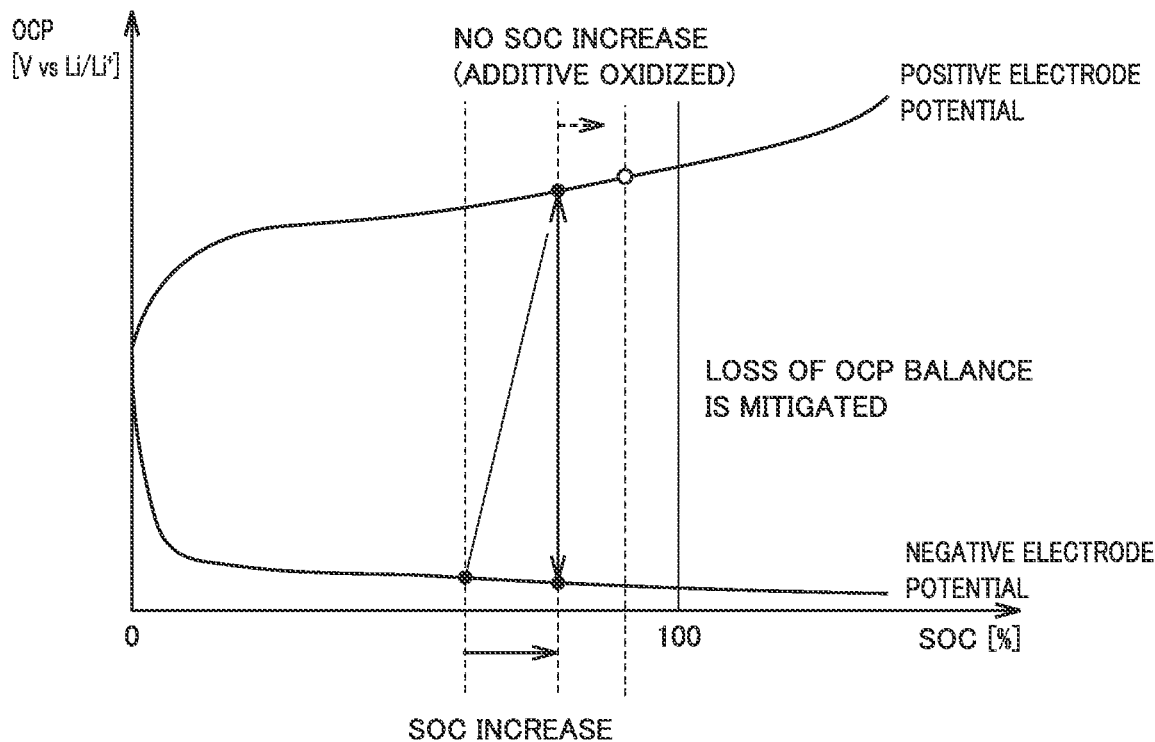
FIG. 3 is a third graph illustrating an OCP balance.
Figure 4:
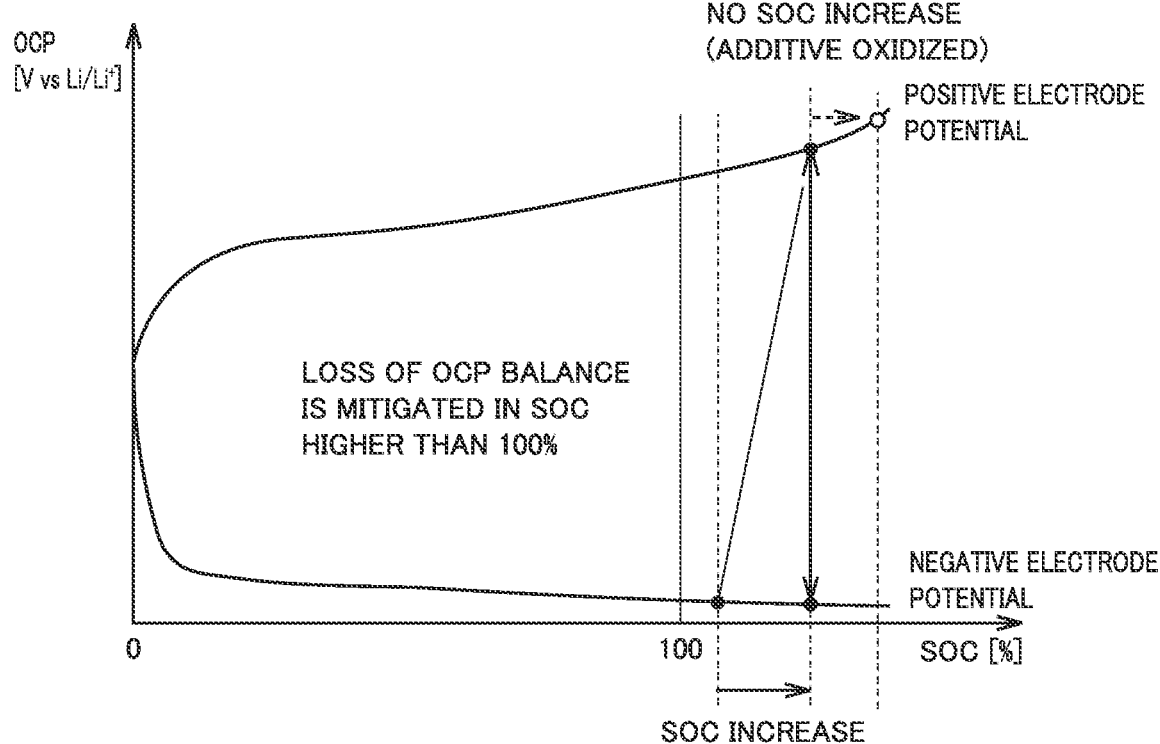
FIG. 4 is a fourth graph illustrating an OCP balance.

In the following, embodiments according to the present disclosure (herein called "present embodiment") are described. However, the description below does not limit the scope of claims.

<Method of Producing Lithium-Ion Battery>

FIG. 5 is a flowchart schematically illustrating a method of producing a lithium-ion battery according to the present embodiment. The method of producing a battery according to the present embodiment includes at least "(A) preparing a battery", "(B) detecting a capacity loss", and "(C) performing capacity restoration treatment".

<<(A) Preparing First Battery>>

FIG. 6 is a schematic view illustrating an example configuration of a lithium-ion battery according to the present embodiment.

The method of producing a battery according to the present embodiment includes preparing a first battery 100.

For instance, first battery 100 may be newly produced. For instance, first battery 100 may be collected from the market. For instance, first battery 100 may be collected from regular inspection and/or the like of an electric vehicle, power storage equipment, an electronic device, and/or the like on which first battery 100 is mounted. For instance, first battery 100 may be collected together with an electric vehicle, an electronic device, and/or the like on which first battery 100 is mounted.

(Lithium-Ion Battery)

First battery 100 is a lithium-ion battery. First battery 100 includes a casing 101. Casing 101 may be made of an aluminum (Al) alloy, for example. Casing 101 is hermetically sealed. Casing 101 is prismatic (a flat, rectangular parallelepiped). Alternatively, casing 101 may be cylindrical or the like. Casing 101 may be a pouch made of an aluminum-laminated film, for example.

Casing 101 includes a container 102 and a cap 103. Cap 103 is bonded to container 102 by laser beam welding, for example. Cap 103 is equipped with a positive electrode terminal 91 and a negative electrode terminal 92. Cap 103 may be further equipped with a liquid inlet, a gas-discharge valve, a current interrupt device (CID), and the like, for example. Casing 101 accommodates an electrode group 50 and an electrolyte solution (not illustrated).

Figure 7:
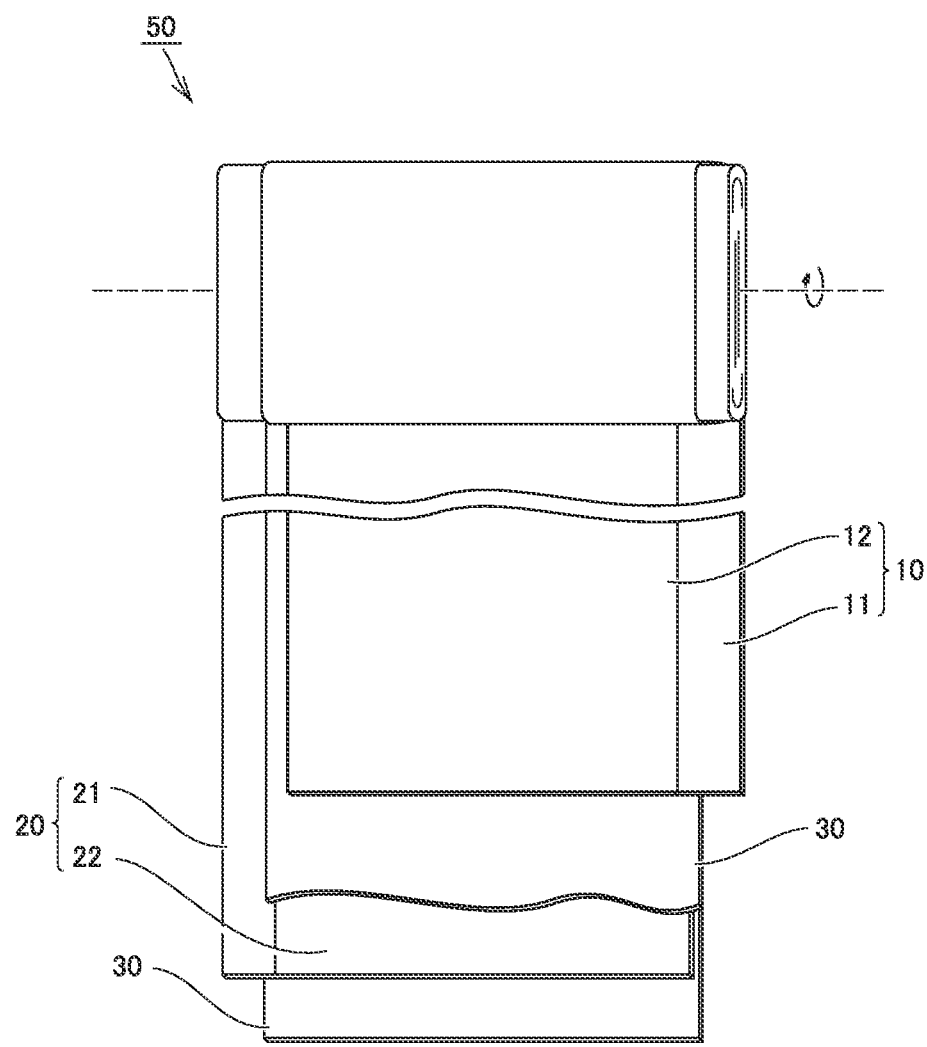
FIG. 7 is a schematic view illustrating an example configuration of an electrode group according to the present embodiment.

FIG. 7 is a schematic view illustrating an example configuration of the electrode group according to the present embodiment.

Electrode group 50 is a wound-type one. Electrode group 50 is formed by stacking a positive electrode 10, a separator 30, a negative electrode 20, and separator 30 in this order and then winding them in a spiral manner. Electrode group 50 is impregnated with the electrolyte solution. In other words, first battery 100 includes at least positive electrode 10, negative electrode 20, and the electrolyte solution.

Electrode group 50 may be a stack-type one. More specifically, electrode group 50 may be formed by alternately stacking one positive electrode 10 and one negative electrode 20 and then repeating this alternate stacking process more than once. In each space between positive electrode 10 and negative electrode 20, separator 30 is interposed.

(Positive Electrode)

Positive electrode 10 is in sheet form. Positive electrode 10 includes a positive electrode current collector 11 and a positive electrode active material layer 12. Positive electrode active material layer 12 is disposed on a surface of positive electrode current collector 11. Positive electrode active material layer 12 may be disposed on only one side of positive electrode current collector 11. Positive electrode active material layer 12 may be disposed on both sides of positive electrode current collector 11. Positive electrode current collector 11 may be an Al foil, for example.

Positive electrode active material layer 12 contains at least a positive electrode active material. The positive electrode active material is not particularly limited. The positive electrode active material may be lithium cobalt oxide (LiCoO$_2$), lithium nickel oxide (LiNiO$_2$), lithium manganese oxide (such as LiMnO$_2$ and/or LiMn$_2$O$_4$), lithium nickel cobalt manganese oxide (such as LiNi$_{1/3}$Co$_{1/3}$Mn$_{1/3}$O$_2$ and/or LiNi$_{0.5}$Co$_{0.2}$Mn$_{0.3}$O$_2$), lithium nickel cobalt aluminate (such as LiNi$_{0.82}$Co$_{0.15}$Al$_{0.03}$O$_2$), and/or lithium iron phosphate (LiFePO$_4$), for example.

Positive electrode active material layer 12 may further contain a conductive material and a binder, for example. The conductive material is not particularly limited. The conductive material may be carbon black, for example. The binder is not particularly limited. The binder may be polyvinylidene difluoride (PVdF), for example.

(Negative Electrode)

Negative electrode 20 is in sheet form. Negative electrode 20 includes a negative electrode current collector 21 and a negative electrode active material layer 22. Negative electrode active material layer 22 is disposed on a surface of negative electrode current collector 21. Negative electrode active material layer 22 may be disposed on only one side of negative electrode current collector 21. Negative electrode active material layer 22 may be disposed on both sides of negative electrode current collector 21. Negative electrode current collector 21 may be made of a copper (Cu) foil, for example.

For instance, part of Li$^+$ may become inert Li and adhere to a surface and/or the like of negative electrode 20 during charge. As a result of part of Li$^+$ becoming inert Li, OCP goes out of balance. The inert Li may be a Li compound, for example. The Li compound may be LiF, Li$_2$CO$_3$, Li$_2$O, and/or LiCO$_2$R (R represents an alkyl group and/or the like), for example. The Li compound may be identified by NMR (nuclear magnetic resonance) and/or XPS (x-ray photoelectron spectroscopy), for example.

A negative electrode active material is not particularly limited. The negative electrode active material may be graphite, soft carbon, hard carbon, silicon, silicon oxide, silicon-based alloy, tin, tin oxide, tin-based alloy, and/or lithium titanium oxide, for example.

Negative electrode active material layer 22 may further contain a binder, for example. The binder is not particularly limited. The binder may be carboxymethylcellulose (CMC) and/or styrene-butadiene rubber (SBR), for example.

(Electrolyte Solution)

In the present embodiment, the electrolyte solution contains a Li salt, a solvent, and an additive in advance of detection of a capacity loss. Typically, a Li salt, a solvent, and an additive have been contained in the electrolyte solution since injection of the electrolyte solution into casing 101.

The Li salt is dissolved in the solvent. The concentration of the Li salt may range from 0.5 mol/L to 2 mol/L (from 0.5 M to 2 M), for example. The Li salt may be LiPF$_6$, LiBF$_4$, LiN(FSO$_2$)$_2$, and/or LiN(CF$_3$SO$_2$)$_2$, for example.

The solvent is aprotic. The solvent may be a mixture of a cyclic carbonate and a chain carbonate, for example. The mixing ratio may be "(cyclic carbonate)/(chain carbonate)= 1/9 to 5/5 (volume ratio)", for example. The cyclic carbonate may be ethylene carbonate (EC), propylene carbonate (PC), butylene carbonate (BC), and/or fluoroethylene carbonate (FEC), for example. The chain carbonate may be dimethyl carbonate (DMC), ethyl methyl carbonate (EMC), and/or diethyl carbonate (DEC), for example.

(Additive)

The additive according to the present embodiment consists of a component usable in capacity restoration treatment. The capacity restoration treatment is described below in detail. The additive according to the present embodiment functions like a so-called "sacrificial agent". In the capacity restoration treatment, oxidation of the positive electrode active material may be mitigated while the additive is being oxidized. In other words, the additive may be oxidized instead of the positive electrode active material during charge.

The additive has a predetermined oxidation potential. The oxidation potential refers to an electric potential at which oxidation reaction of the additive takes place. For instance, the oxidation reaction may cause the additive to degrade. For instance, the oxidation reaction may cause the additive to generate gas.

The content of the additive (the amount thereof to be added) is not particularly limited. The higher the content of the additive is, the greater the amount of capacity restorable by the capacity restoration treatment may be. However, an excessive content of the additive may increase the viscosity of the electrolyte solution and may increase resistance. The additive may be contained in the electrolyte solution in an amount ranging from 0.001 mol/L to 0.1 mol/L, for example.

The oxidation potential of the additive is higher than the positive electrode potential of first battery 100 having an SOC of 100% (in other words, a positive electrode potential in a fully-charged state). The positive electrode potential in a fully-charged state may range from 3.6 V vs. Li/Li$^+$ to 4.0 V vs. Li/Li$^+$, for example. The expression "V vs. Li/Li$^+$" is the unit of electric potential. A value of electric potential with the unit "V vs. Li/Li$^+$" is a value relative to the electric potential at which Li oxidation-reduction reaction takes place (which is set as 0 V). The positive electrode potential in a fully-charged state may range from 3.6 V vs. Li/Li$^+$ to 3.7 V vs. Li/Li$^+$, for example.

As long as the oxidation potential of the additive is higher than the positive electrode potential in a fully-charged state, the additive is not particularly limited. When the oxidation potential of the additive is excessively high, however, oxidation of the additive may cause an irreversible structural change of the positive electrode active material, the negative electrode active material, and the like and may also cause degradation of the solvent and the like of the electrolyte solution. These phenomena may decrease capacity, instead of increasing it. Therefore, it is desirable that the oxidation potential of the additive be an electric potential at which neither structural change of the positive electrode active material and the negative electrode active material nor degradation of the solvent of the electrolyte solution occur.

For instance, a compound having a desired oxidation potential may be selected by molecular orbital calculation. For instance, the oxidation potential of the additive may range from 3.71 V vs. Li/Li$^+$ to 4.05 V vs. Li/Li$^+$. For instance, the oxidation potential of the additive may be equal to the positive electrode potential of first battery 100 having an SOC higher than 100% and not higher than 120%.

The additive may consist of one component. The additive may consist of a plurality of components. The plurality of components may be different from each other in oxidation potential. In that case, the capacity restoration treatment may be performed multiple times in a separate manner. For instance, the additive may consist of two components. For instance, the additive may consist of three components.

The additive may include at least one selected from the group consisting of 2-methoxynaphthalene and thiophene, for example. When the additive consists of a plurality of components, the plurality of components may include at least one selected from the group consisting of 2-methoxynaphthalene and thiophene.

It is considered that the oxidation potential of 2-methoxynaphthalene is about 3.92 V vs. Li/Li$^+$. It is considered that the oxidation potential of thiophene is about 4.01 V vs. Li/Li$^+$. The oxidation potential of each of 2-methoxynaphthalene and thiophene may be higher than the positive electrode potential in a fully-charged state. Therefore, each of 2-methoxynaphthalene and thiophene may be usable in the capacity restoration treatment.

The additive may include 2-methoxynaphthalene and thiophene. The oxidation potential of 2-methoxynaphthalene is different from the oxidation potential of thiophene. When the additive includes both 2-methoxynaphthalene and thiophene, the capacity restoration treatment may be performed at least twice.

The additive may include at least one selected from the group consisting of 2-methoxynaphthalene (3.92 V vs. Li/Li$^+$), thiophene (4.01 V vs. Li/Li$^+$), o-dimethoxybenzene (4.05 V vs. Li/Li$^+$), 1,2,4-trimethoxybenzene (3.71 V vs. Li/Li$^+$), 1,6-dimethoxynaphthalene (3.88 V vs. Li/Li$^+$), and N-methylpyrrole (3.77 V vs. Li/Li$^+$), for example. The value of electric potential in parentheses refers to the oxidation potential of the substance.

(Other Additives)

The electrolyte solution may further contain other additives. In the context of the present embodiment, these other additives refer to additives that are not used in the capacity restoration treatment.

An example of these other additives may be a solid electrolyte interface (SEI) forming agent. The SEI-forming agent degrades at an SOC of 100% or lower to form a film on, for example, a surface of the negative electrode active material. A typical SEI-forming agent undergoes reduction and degradation at a low SOC to form a film on a surface of the negative electrode active material. The capacity restoration treatment according to the present embodiment is performed at an SOC higher than 100%. Therefore, the SEI-forming agent may be unusable in the capacity restoration treatment according to the present embodiment. Examples of the SEI-forming agent may include vinylene carbonate (VC) and vinylethylene carbonate (VEC).

An example of the above-mentioned other additives may be an overcharging inhibitor. When first battery 100 is overcharged, the overcharging inhibitor degrades to generate gas. The gas generation causes an increase in the internal pressure of casing 101. This prompts activation of the CID and the like. Under normal circumstances, the oxidation potential of the overcharging inhibitor is within the electric potential range where a structural change of the positive electrode active material may occur. For instance, the oxidation potential of the overcharging inhibitor may be 4.5 V vs. Li/Li$^+$ or higher. When charging is carried out in such a way that the overcharging inhibitor degrades, an irreversible structural change of the positive electrode active material may occur to decrease the capacity of first battery 100 instead of increasing it. In addition, degradation of the overcharging inhibitor and the consequent activation of the CID, if occurs, causes electric current paths to be cut. When electric current paths are cut, the battery becomes unusable. Therefore, the overcharging inhibitor may be unusable in the capacity restoration treatment according to the present embodiment. Examples of the overcharging inhibitor may include cyclohexylbenzene (CHB) and biphenyl (BP).

(Separator)

Separator 30 is interposed between positive electrode 10 and negative electrode 20. Separator 30 is a porous film. Separator 30 is electrically insulating. Separator 30 may be made of polyolefin, for example. On a surface of separator 30, a heat-resistant film may be formed. The heat-resistant film may contain a heat-resistant material such as boehmite and alumina, for example.

<<(B) Detecting Capacity Loss>>

The method of producing a battery according to the present embodiment includes detecting a capacity loss of first battery 100.

After used and/or stored, for example, first battery 100 may undergo a capacity loss. The "capacity loss" according to the present embodiment refers to a situation where the capacity that is usable at a point of time in question has been decreased relative to a rated capacity.

The method of detecting a capacity loss is not particularly limited. A capacity loss may be detected by any conventional method. A capacity loss may be detected in, for example, an electric vehicle on which first battery 100 is mounted.

For instance, a capacity loss may be detected directly by measuring the capacity of first battery 100. Capacity may be measured by, for example, performing charge and discharge at a rate from 0.1 to 1 C and an SOC from 0 to 100%, for example. The "C" is the unit of rate. At a rate of 1 C, fully charging first battery 100 completes in one hour.

A capacity loss may be detected indirectly. For instance, a capacity loss may be detected based on an increment in resistance found by measuring the resistance of first battery 100. For instance, a capacity loss may be detected based on the usage history of first battery 100. The usage history may be, for example, the amount of time elapsed between production of first battery 100 and the point of time in question, the number of use (charge and discharge) of first battery 100, the temperature environment that first battery 100 has experienced, and/or the range of voltage that first battery 100 has experienced. A capacity loss may be detected based on a plurality of factors (such as resistance, voltage, and temperature).

<<(C) Performing Capacity Restoration Treatment>>

The method of producing a battery according to the present embodiment includes performing capacity restoration treatment on first battery 100 having a detected capacity loss to produce a second battery (not illustrated). In the capacity restoration treatment, first battery 100 is charged in such a way that at least part of the additive is oxidized.

The structure of the second battery is substantially the same as the structure of first battery 100 except that the capacity of the second battery is higher than the capacity of first battery 100. The composition of an electrolyte solution of the second battery is different from the composition of the electrolyte solution of first battery 100. Therefore, the second battery is regarded as a new product that is not the same as first battery 100.

For instance, the capacity restoration treatment may be performed in an electric vehicle and/or the like on which first battery 100 is mounted (namely, on board). The capacity restoration treatment may be performed outside an electric vehicle and/or the like on which first battery 100 was mounted, after removal of first battery 100 from the electric vehicle and/or the like.

The capacity restoration treatment according to the present embodiment is performed in such a way that the capacity of first battery 100 increases. When first battery 100 is charged excessively, for example, its capacity may decrease instead of increasing. In this case, it is regarded that the capacity restoration treatment according to the present embodiment is not performed. For instance, when first battery 100 is charged in such a way that the above-described overcharging inhibitor (such as CHB) is oxidized, an irreversible structural change of the positive electrode active material may occur and an unrestorable capacity loss may occur. In this case, it is regarded that the capacity restoration treatment is not performed.

In the capacity restoration treatment according to the present embodiment, first battery 100 is charged. In the capacity restoration treatment, a typical charge/discharge apparatus may be used. The charging may be a charging in a constant-current (CC) mode, for example. It is considered that a lower charging rate is better. When the charging rate is high, overpotential may occur to cause problems such as oxidation of a component other than the target component. For instance, the charging rate may range from 0.01 C to 0.5 C. The charging rate may range from 0.1 C to 0.5 C.

The charging is carried out in such a way that at least part of the additive is oxidized. Desirably, the positive electrode potential keeps substantially constant near the oxidation potential of the target component so as to avoid oxidation of a component other than the target component. For instance, switching from a CC mode charging to a constant-voltage (CV) mode charging may be carried out near the oxidation potential of the additive.

In the capacity restoration treatment according to the present embodiment, substantially the entire additive may be oxidized or part of the additive may be oxidized. When the additive consists of a plurality of components and the plurality of components are different from each other in oxidation potential, first battery 100 may be charged in such a way that part of the plurality of components is oxidized and the other part of the plurality of components is not oxidized. In this case, a second capacity restoration treatment may be performed when a capacity loss occurs again after a first capacity restoration treatment is performed. In the second capacity restoration treatment, charging is carried out so as to oxidize the remaining component which was not oxidized in the first capacity restoration treatment. A third capacity restoration treatment and further capacity restoration treatments may be performed in accordance with the number of components included in the additive. For instance, when the additive includes four components that are different from each other in oxidation potential, the capacity restoration treatment may be performed four times in total.

Examples

Next, examples according to the present disclosure are described. However, the description below does not limit the scope of claims.

<<Preparation of Test Battery>>

A lithium-ion battery was prepared. The lithium-ion battery was a used battery. More specifically, the capacity of the lithium-ion battery had decreased due to use.

The lithium-ion battery was disassembled, and a positive electrode and a negative electrode were collected. It was considered that the OCP balance between the positive electrode and the negative electrode was lost. Each of the positive electrode and the negative electrode was cut into a predetermined size. After cutting, the positive electrode section and the negative electrode section were assembled into a small test battery. It was considered that the positive electrode potential of the test battery in a fully-charged state was about 3.65 V vs. $Li/Li^+$.

Into the test battery, a first electrolyte solution was injected. The amount injected was 50% of a standard amount. The "standard amount" refers to an amount of electrolyte solution regarded as necessary for the test battery in this experiment. The first electrolyte solution consisted of components described below.

(First Electrolyte Solution)
Li salt: LiPF$_6$ (concentration, 1.1 mol/L)
Solvent: [EC/EMC/DMC=3/3/4 (volume ratio)]
Additive: None Following the injection of the first electrolyte solution, the test battery was hermetically sealed. Following the hermetic sealing, initial properties (initial capacity, resistance, and the like) of the test battery were measured.

Following the measurement of the initial properties, the test battery was opened and injected with a second electrolyte solution. The amount injected was 50% of the standard amount. In other words, the total amount of the first electrolyte solution and the second electrolyte solution was equal to the standard amount (100%). Following the injection of the second electrolyte solution, the test battery was hermetically sealed again. The second electrolyte solution consisted of components described below.

(Second Electrolyte Solution)
Li salt: LiPF$_6$ (concentration, 1.1 mol/L)
Solvent: [EC/EMC/DMC=3/3/4 (volume ratio)]
Additive: two types, namely 2-methoxynaphthalene and thiophene The electrolyte solution (a mixed liquid of the first electrolyte solution and the second electrolyte solution) in the hermetically sealed test battery contained 0.025 mol/L of 2-methoxynaphthalene and 0.025 mol/L of thiophene.

<<Capacity Restoration Test>>
(First Capacity Restoration Treatment)

Following the injection of the second electrolyte solution, a first capacity restoration treatment was performed on the test battery. More specifically, the test battery was charged in such a way that 2-methoxynaphthalene was oxidized and thiophene was not oxidized. Following the charging, the capacity of the test battery was measured.

(Second Capacity Restoration Treatment)

Following the capacity measurement, a second capacity restoration treatment was performed on the test battery. More specifically, the test battery was charged in such a way that thiophene was oxidized. Following the charging, the capacity of the test battery was measured.

<<Results>>

Figure 8:
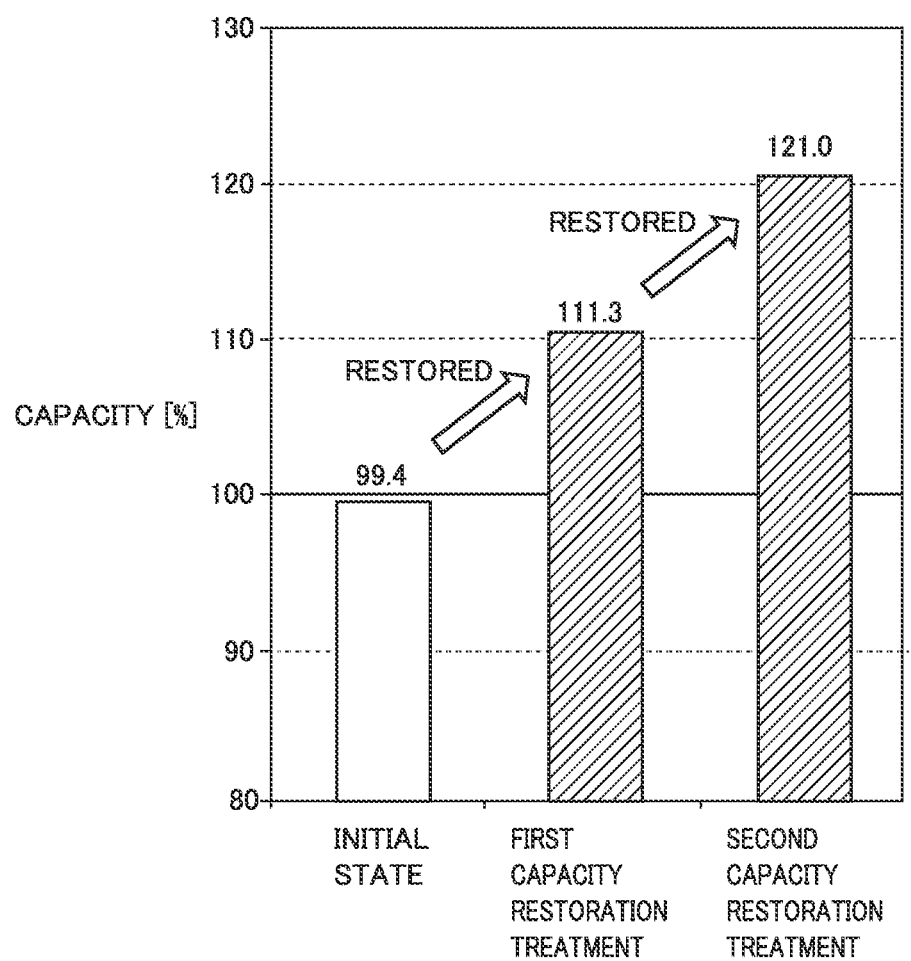
FIG. 8 is a graph illustrating results of an experiment.

FIG. 8 is a graph illustrating results of the experiment.

The ordinate in the graph represents the ratio of the capacity (unit, Ah/cm$^2$) of the test battery per unit area to the capacity (unit, Ah/cm$^2$) of the pre-disassembly lithium-ion battery per unit area. Every time the capacity restoration treatment was performed, an increase in capacity was observed.

The oxidation potential of each of 2-methoxynaphthalene and thiophene is higher than the positive electrode potential in a fully-charged state. Therefore, each of 2-methoxynaphthalene and thiophene may be added to the electrolyte solution in an initial state. In this configuration, the capacity restoration treatment may be performed without the lithium-ion battery being opened.

The above-described experiment involves performing the first and second capacity restoration treatments in a successive manner. Practical applications may involve the following: after the first capacity restoration treatment is performed, the battery is used; and when a capacity loss is detected again, the second capacity restoration treatment is performed.

The embodiments and examples disclosed herein are illustrative and non-restrictive in any respect. The technical scope indicated by the claims encompasses any modifications within the scope and meaning equivalent to the terms of the claims.

What is claimed is:

1. A lithium-ion battery comprising at least:
a positive electrode;
a negative electrode; and
an electrolyte solution,
the electrolyte solution containing a lithium salt, a solvent, and an additive,
the additive consisting of a plurality of components,
the plurality of components being different from each other in oxidation potential,
each of the plurality of components having the oxidation potential higher than a positive electrode potential in a fully-charged state,
the positive electrode includes a positive electrode active material layer that includes at least one selected from the group consisting of lithium cobalt oxide, lithium nickel oxide, lithium manganese oxide, lithium nickel cobalt manganese oxide, and lithium nickel cobalt aluminate,
the additive includes 2-methoxynaphthalene.

2. The lithium-ion battery according to claim 1, wherein the positive electrode potential in the fully-charged state ranges from 3.6 V vs. Li/Li$^+$ to 4.0 V vs. Li/Li$^+$.

3. The lithium-ion battery according to claim 1, wherein a concentration of the Li salt in the electrolyte solution is from 0.5 mol/L to 2 mol/L.

4. The lithium-ion battery according to claim 1, wherein the Li salt is selected from the group consisting of LiPF$_6$, LiBF$_4$, LiN(FSO$_2$)$_2$, and LiN(CF$_3$SO$_2$)$_2$.

5. The lithium-ion battery according to claim 1, wherein the solvent is a mixture of a cyclic carbonate and a chain carbonate in a mixing ratio ((cyclic carbonate)/(chain carbonate)) of from 1/9 to 5/5 by volume.

6. The lithium-ion battery according to claim 1, wherein the solvent is a mixture of ethylene carbonate (EC), ethyl methyl carbonate (EMC), and dimethyl carbonate (DMC) in a mixing ratio of 3/3/4 by volume.

7. The lithium-ion battery according to claim 1, wherein the additive is contained in the electrolyte solution in an amount ranging from 0.025 mol/L to 0.1 mol/L.

8. The lithium-ion battery according to claim 1, wherein each of the plurality of components has the oxidation potential ranging from 3.71 V vs. Li/Li$^+$ to 4.05 V vs. Li/Li$^+$.

9. The lithium-ion battery according to claim 1, wherein the additive is contained in the electrolyte solution in an amount ranging from 0.001 mol/L to 0.1 mol/L.

10. The lithium-ion battery according to claim 1, wherein the additive further includes at least one selected from the group consisting of o-dimethoxybenzene, 1,2,4-trimethoxybenzene, 1,6-dimethoxynaphthalene, and N-methylpyrrole.

11. The lithium-ion battery according to claim 10, wherein the additive is contained in the electrolyte solution in an amount ranging from 0.025 mol/L to 0.1 mol/L.

12. The lithium-ion battery according to claim 10, wherein the additive is contained in the electrolyte solution in an amount ranging from 0.05 mol/L to 0.1 mol/L.

* * * * *